United States Patent [19]

Myers

[11] Patent Number: 5,893,201
[45] Date of Patent: Apr. 13, 1999

[54] INSTALLATION TOOL FOR IRRIGATION EMITTER BARBS

[76] Inventor: Michael R. Myers, 8450 W. Clarieston Blvd. #1019, Las Vegas, Nev. 89117

[*] Notice: This patent is subject to a terminal disclaimer.

[21] Appl. No.: 08/923,908

[22] Filed: Sep. 4, 1997

Related U.S. Application Data

[63] Continuation of application No. 08/779,305, Jan. 6, 1997, Pat. No. 5,722,142.

[51] Int. Cl.⁶ .......................................................... B23P 19/02
[52] U.S. Cl. .......................................................... 29/268; 29/242
[58] Field of Search ................................. 29/268, 267, 242, 29/224, 243.56, 270, 283.5, 432; 30/366

[56] References Cited

U.S. PATENT DOCUMENTS

| | | |
|---|---|---|
| 119,895 | 10/1871 | Spaulding et al. . |
| 1,464,807 | 8/1923 | Clark . |
| 1,938,102 | 12/1933 | Hill . |
| 2,588,043 | 7/1952 | Rabinowitz et al. . |
| 2,594,942 | 4/1952 | Lincoln . |
| 2,986,870 | 6/1961 | Blais . |
| 3,006,063 | 10/1961 | Linan . |
| 3,698,419 | 10/1972 | Tura . |
| 3,815,831 | 6/1974 | Jooste . |
| 3,827,125 | 8/1974 | Matthews . |
| 3,856,208 | 12/1974 | Naftaly . |
| 3,877,280 | 4/1975 | Cornell . |
| 3,885,743 | 5/1975 | Wake . |
| 4,222,985 | 9/1980 | Greenleaf . |
| 4,235,083 | 11/1980 | Tracy . |
| 4,284,241 | 8/1981 | Azalbert . |
| 4,392,616 | 7/1983 | Olson . |
| 4,497,321 | 2/1985 | Fearing et al. ........................ 29/268 |
| 4,522,339 | 6/1985 | Costa . |
| 4,561,159 | 12/1985 | Schuster . |
| 4,574,477 | 3/1986 | Lemkin et al. . |
| 4,785,538 | 11/1988 | Meyer . |
| 4,787,139 | 11/1988 | Sweet . |
| 4,825,339 | 4/1989 | Boudon et al. . |
| 5,058,414 | 10/1991 | Hayes . |
| 5,168,616 | 12/1992 | Klein . |
| 5,177,846 | 1/1993 | Bryant . |
| 5,282,302 | 2/1994 | Starks et al. . |
| 5,398,718 | 3/1995 | Roinick, Sr. . |
| 5,566,438 | 10/1996 | Bullock ................................. 29/268 |
| 5,647,112 | 7/1997 | Arvizu ................................... 29/268 |
| 5,671,520 | 9/1997 | Scarborough ......................... 29/268 |
| 5,722,142 | 3/1998 | Myers .................................... 29/268 |

*Primary Examiner*—David A. Scherbel
*Assistant Examiner*—Lee Wilson
*Attorney, Agent, or Firm*—Frank J. McGue

[57] ABSTRACT

A tool is provided for use in installing irrigation barb emitters in irrigation tubing. The tool comprises a cradle member having a cradle handle and a cradle jaw on opposing ends and a barb holder member having a barb holder handle and a barb holder jaw on opposing ends. The cradle member and the barb holder member are arranged in crossed relation. A cradle mounted on the cradle jaw is suitable for receiving a peripheral portion of an irrigation tubing. A barb holder mounted on the barb holder jaw is a hollow cylindrical cavity formed by two opposing barb holder jaw members. The barb holder has an axis aligned with the cradle with the opposing barb holder jaw members forming a slot opening therebetween. The slot opening is sized to allow snap fitting of the hollow cylinder of a barb emitter laterally into the hollow cylindrical cavity. A shoulder is formed by the lower edges of the opposing jaw members and acts against an annular disk shoulder on a barb emitter to force a piercing point on the barb emitter to penetrate irrigation tubing held within the cradle when the cradle jaw and the barb holder jaw are brought together. The barb emitter is released from the barb holder and retained within the irrigation tubing upon movement of the barb holder away from the cradle.

10 Claims, 2 Drawing Sheets

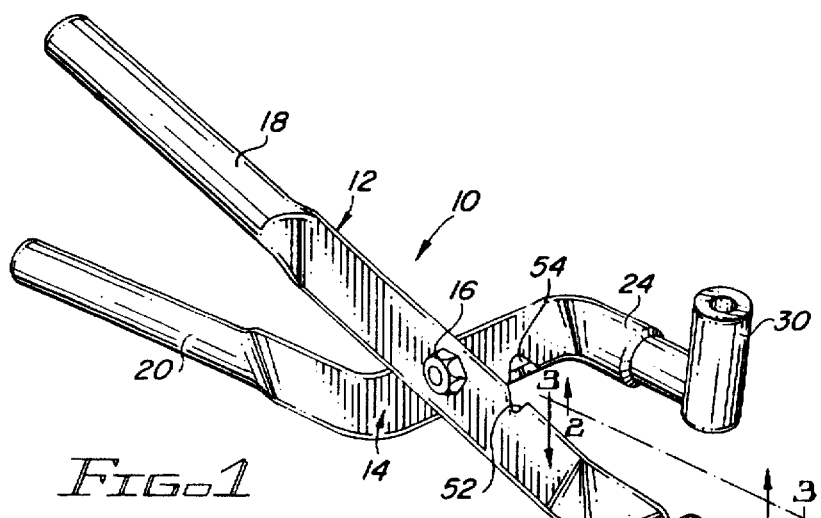
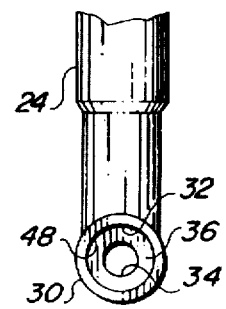
FIG-1
FIG-2
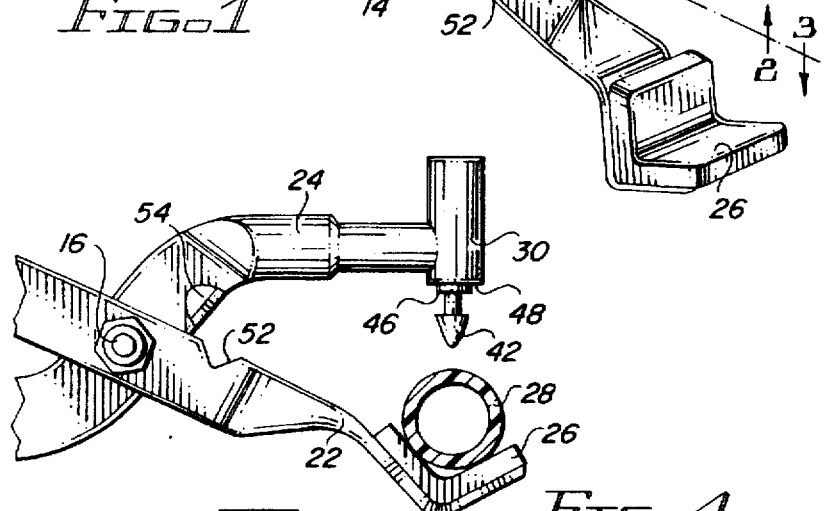
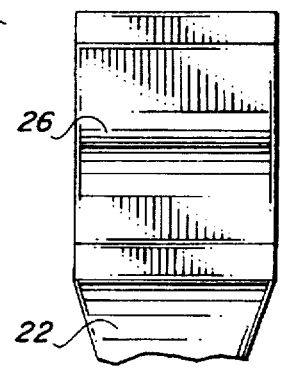
FIG-4
FIG-3
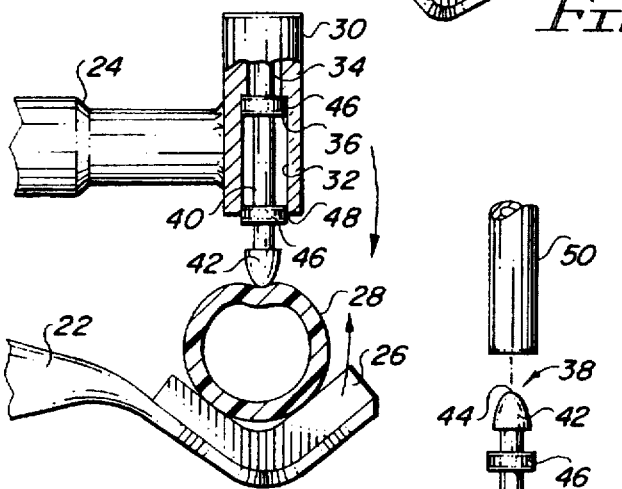
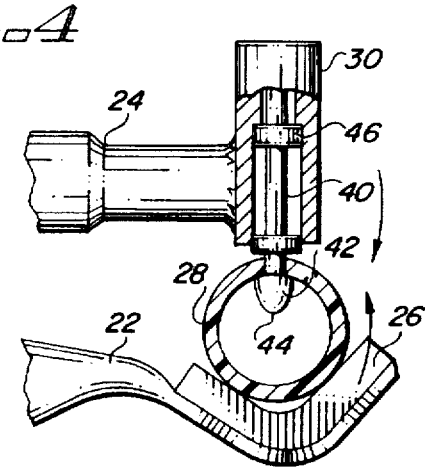
FIG-5A
FIG-5B
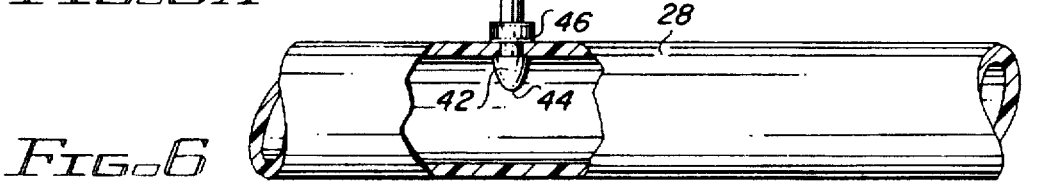
FIG-6

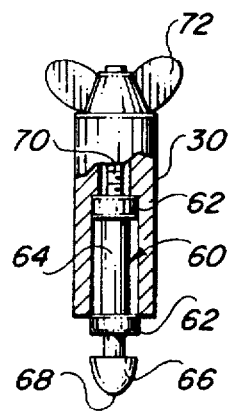
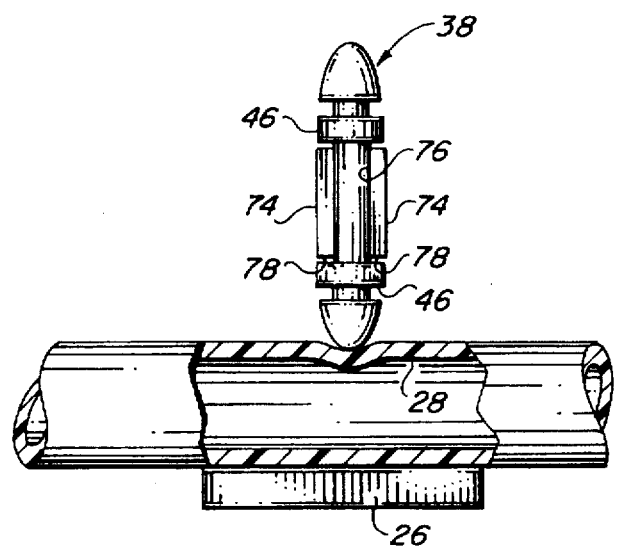
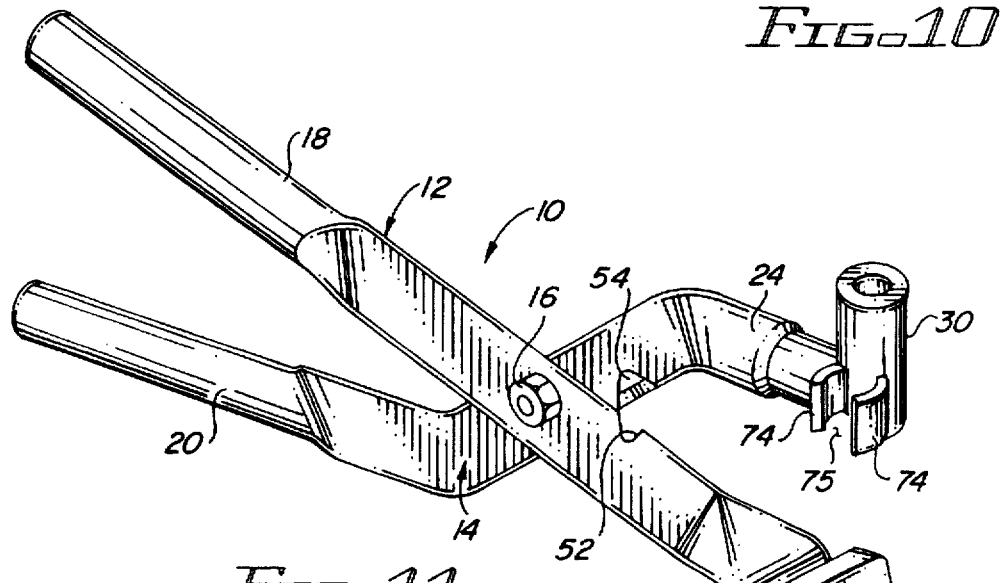
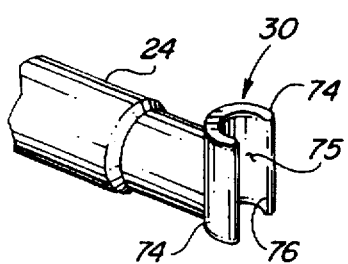
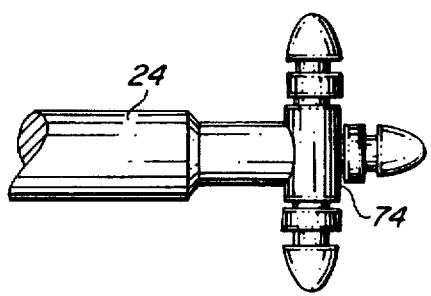

5,893,201

1

INSTALLATION TOOL FOR IRRIGATION EMITTER BARBS

RELATED APPLICATION

This is a continuation-in-part of co-pending application Ser. No. 08/779,305 filed on Jan. 6, 1997, now U.S. Pat. No. 5,722,142.

TECHNICAL FIELD

This invention relates to the field of irrigation tools, and, more particularly, to a tool for installing irrigation emitter barbs in irrigation tubing.

BACKGROUND OF THE INVENTION

It is common to use plastic tubing to distribute water to various locations for irrigation purposes. In such use, hollow irrigation emitter barbs are mounted as desired on the plastic tubing. Such barbs are hollow allowing the water contained within the tubing to be distributed, or emitted, as desired. Small diameter flexible tubing can be mounted on the barbs to place the water where desired.

Irrigation emitter barbs are generally symmetrical and are provided with sharp piercing points at both ends to penetrate the wall of the tubing. Further, enlarged heads are provided to impede the withdrawal of the barb from the tubing. While irrigation emitter barbs can be installed by hand, the sharp piercing points can cause injury to workers. In fact, the present invention was inspired after applicant viewed the bloodied hands of workers installing a large number of such irrigation emitter barbs.

Various types of installation tools are well known in art. For example, punch tools have been employed which punch the hole in the tubing for the subsequent placement of irrigation emitter barbs. However, installation still requires handling of the sharp piercing points by the installer.

U. S. Pat. No. 4,222,985 entitled "Laboratory Tool" which issued on Sep. 16, 1980 to Greenleaf discloses a ferrule removal tool which utilizes a solid post and slot combination which engages the end, not the periphery, of a tube to remove a ferrule therefrom.

U. S. Pat. No. 4,497,321 entitled "Ear Tag Applicators" which issued on Feb. 5, 1985 to Fearing et al. shows the use of a tapered pin to engage the interior recess of a hard conical spike portion of a two piece animal tag. The spike rests upon a platform of the device.

U. S. Pat. No. 4,522,339 entitled IRRIGATION FITTING WITH INSTALLATION BARB AND ASSOCIATED INSTALLATION BARB TOOL which issued on Jun. 11, 1985 to Costa discloses an irrigation fitting barb and associated barb insertion tool. However, the Costa tool requires use of the specific Costa fitting to properly function and thus does not function with standard irrigation emitter barbs.

U. S. Pat. No. 5,177,846 entitled INSERTION TOOL which issued on Jan. 12, 1983 to Bryant discloses a hand held tool for inserting fittings or flow control devices into an irrigation line.

U. S. Pat. No. 4,392,616 entitled SELF-PERFORATING DRIP IRRIGATION DEVICE which issued on Jul. 12, 1983 to Olson shows, in FIGS. 10 and 11, a tool for inserting barbs into an irrigation line.

U. S. Pat. No. 1,464,807 entitled DENTAL INSTRUMENT which issued on Aug. 14, 1923 to Clark shows a plier type tool having a punch at the far end and an anvil portion which cooperates with a recess.

2

U. S. Pat. No. 3,698,419 entitled DEVICES FOR PIERCING TUBES IN CLOSED PRESSURE SYSTEMS which issued on Oct. 17, 1972 to Tura and U. S. Pat. No. 5,398,718 entitled TAP LINE PLIERS which issued on Mar. 21, 1995 to Roinick Sr. are representative of several patents showing plier type tools having a lower jaw which supports a tube and an upper jaw which has a punch.

None of the known prior art disclose the combination set forth herein.

SUMMARY OF THE INVENTION

It is an object of this invention to provide a tool for installing irrigation emitter barbs in irrigation tubing.

It is a further object of this invention to provide a tool for installing irrigation emitter barbs in irrigation tubing in one step.

It is still another object of this invention to provide a tool for safely installing irrigation emitter barbs in irrigation tubing.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of one embodiment of the present invention;

FIG. 2 is a bottom view of a barb holder jaw of the device depicted in FIG. 1 taken along line 2—2;

FIG. 3 is a top view of a cradle jaw of the device depicted in FIG. 1 taken along line 3—3;

FIG. 4 is a side view of the device depicted in the device of FIG. 1 holding irrigation tubing in the cradle jaw and an irrigation emitter barb in the barb holder jaw;

FIG. 5A and 5B depict the operation of the device depicted in FIG. 1 in installing the irrigation emitter barb into irrigation tubing;

FIG. 6 shows the installed irrigation emitter barb in the irrigation tubing;

FIG. 7 shows the use of a punch accessory in connection with the present device;

FIG. 8 shows a perspective view of another embodiment of the barb holder jaw of the present invention;

FIG. 9 shows a side view of the embodiment of FIG. 8 holding an irrigation emitter barb in the barb holder jaw;

FIG. 10 is a front cross sectional view of the device of FIG. 8 depicting the operation thereof in installing the irrigation emitter barb into irrigation tubing; and FIG. 11 shows a perspective view of a third embodiment of the present invention.

DESCRIPTION OF THE PREFERRED EMBODIMENT

Referring more particularly to the drawings by characters of reference, FIGS. 1–7 disclose one embodiment of an irrigation tool 10. Irrigation tool 10 comprises a cradle member 12 and a barb holder member 14. Cradle member 12 and barb holder member 14 are arranged in crossed relation and pivotally connected intermediate their ends at pivot 16. The portions of cradle member 12 and barb holder member 14 extending rearwardly from pivot 16 constitute cradle handle 18 and barb holder handle 20, respectively. The portions of cradle member 12 and barb holder member 14 extending forwardly from pivot 16 constitute cradle jaw 22 and barb holder jaw 24, respectively.

It will be understood by those skilled in the art that other plier type arrangements would be applicable to the present invention. For example, a double pivot vice grip plier arrangement would also be suitable for use in the present invention.

Mounted at end of cradle jaw 22 is a cradle 26 which is an upwardly opening V-shape and elongated widthwise for receiving a peripheral portion of irrigation tubing 28. Mounted on barb holder jaw 24 directly opposing cradle 26 is a barb holder 30. Barb holder 30 is a hollow cylinder having an axis aligned with the vertex of cradle 26.

As best seen in FIGS. 2 and 5, in the preferred embodiment, the hollow interior of barb holder 30 comprises a lower cavity 32 and a upper cavity 34 concentrically oriented with respect to one another. Both cavities 32 and 34 are cylindrically shaped with upper cavity 34 being of smaller diameter than lower cavity 32 thus forming a shoulder 36 therebetween.

As best seen in FIG. 6, an emitter barb 38 generally comprises a hollow cylinder 40 having two enlarged heads 42 having a larger diameter than cylinder 40 at either end thereof. Each enlarged head 42 includes a sharp piercing point 44 which allow barbs 38 to pierce the periphery of irrigation tubing 28. Once enlarged head 42 extends completely into irrigation tubing 28, its larger diameter impedes its withdrawal from irrigation tubing 28.

Further, emitter barb 38 includes two annular shoulder disks 46. Shoulder disks 46 in cooperation with enlarged heads 42 hold the wall of irrigation tubing 28 therebetween when emitter barb 38 is properly inserted therein. As is well known in the art, emitter barb 38 and irrigation tubing 28 are manufactured of plastics.

As best seen in FIGS. 5A and 5B, upper cavity 34 is sized to releasably engage enlarged head 42 of emitter barb 38 while lower cavity 32 is large enough to accommodate shoulder disk 46. To use, one enlarged head 42 of emitter barb 38 is inserted into and engaged by upper cavity 34 while shoulder disk 46 engages shoulder 36. When fully inserted, the second shoulder disk 46 of barb emitter 38 is positioned proximate to opening 48 of barb holder 30.

Irrigation tubing 28 is laid widthwise in cradle 26 as best seen in FIG. 4. Handles 18 and 20 are pushed together thereby pushing barb holder 30 into cradle 26 as best seen in FIG. 5A. Sharp piercing point 44 of enlarged head 42 engages the periphery of irrigation tubing 28, and with additional force, is inserted therethrough as best seen in FIG. 5B. Shoulder 36 in cooperation with upper shoulder disk 46 forces piercing point 44 through the periphery of irrigation tubing 28 while lower shoulder disk 46 prevents insertion beyond the appropriate point. The periphery of irrigation tubing 28 is thereby captured between enlarged head 42 and lower shoulder disk 36.

After insertion, barb holder 30 is withdrawn. As barb holder 30 moves away, upper enlarged head 42 releases from upper cavity 34 and barb emitter 38 is left properly inserted within irrigation tubing 28. As can be seen, upper cavity is sized whereby the frictional force releasably holding upper enlarged head 42 therewithin is less than the force required to withdraw lower enlarged head from irrigation tubing 28.

Inserted barb emitter 38 can be left as is or small extension tubing 50 can be inserted over upper enlarged head 42 to direct water as desired. As an added convenience, tool 10 can include a notch 52 in cradle jaw 22 which mates with a corresponding knife 54 in barb holder jaw 24 to cut such extension tubing 50 to desired lengths.

As seen in FIG. 7, barb holder 30 may also be used in combination with an irrigation tubing punch 60. Punch 60 is useful to install irrigation fittings other than the barb emitter 38 such as a "T" or a 90 degree fitting.

One end of punch 60 is similar to emitter barb 38 in that punch 60 includes a punch shaft 64 having two punch spacers 62 mounted thereon at a distance approximate to the depth of lower cavity 32. At one end of shaft 64 which protrudes from lower cavity 32, a punch tip 66 having an apex 68 is mounted thereon. Apex 68 simply punches holes into irrigation tubing 28 for subsequent installation of alternate fittings.

To prevent withdrawal of punch 60 from barb holder 30 after punching an appropriate hole in irrigation tubing 28, a threaded shaft 70 extends from shaft 64 opposite punch tip 66 completely through upper cavity 34. A wing nut 72 atop barb holder 30 screws onto threaded shaft 70 and, in cooperation with upper top punch spacer 64, firmly but releasably secures punch 60 into barb holder 30.

Still another embodiment of barb holder 30 is depicted in FIGS. 8–10. In this embodiment, mounted on barb holder jaw 24 directly opposing cradle 26 are opposing barb holder jaw members 74. Opposing barb holder jaw members 74 form a hollow cylindrical cavity 75 having a slot opening 76. Similar to the previous embodiment, the axis of hollow cylindrical cavity 75 is aligned with the vertex of cradle 26.

As best seen in FIG. 10, hollow cylindrical cavity 75 is sized to engage the middle of hollow cylinder 40 between the two shoulder disks 46. The lower shoulder disk 46 of emitter barb 38 is engaged by lower edges 78 of jaw members 74 during insertion into irrigation tubing. Also, slot opening 76 is sized to allow snap fitting of hollow cylinder 40 into cavity 75. This embodiment of the invention, as best seen in FIG. 9, is suited for other types of barb emitters 38 which may be, for example, T-shaped and thus not suitable for use in the closed cylinder of barb emitter 30 depicted in FIGS. 1–7.

Still another embodiment seen in FIG. 11 combines the closed cylinder of barb emitter 30 with the opposing jaw members 74 of the embodiments of FIGS. 8–10. In FIG. 11, opposing jaw members 74 are mounted to the exterior of barb holder 30 at right angles to barb holder jaw 24 to maintain alignment with cradle 26. Otherwise, jaw member 74 function the same as discussed previously in connection with FIGS. 8–10.

Although only certain embodiments have been illustrated and described, it will be apparent to those skilled in the art that various changes and modifications may be made therein without departing from the spirit of the invention or from the scope of the appended claims.

What is claimed is:

1. A tool for installing irrigation barb emitters in irrigation tubing, the tool comprising:

a cradle member having a cradle handle and a cradle jaw on opposing ends thereof, and a barb holder member having a barb holder handle and a barb holder jaw on opposing ends thereof, the cradle member and the barb holder member being arranged in crossed relation and connected intermediate the opposing ends at a pivot such that the cradle handle opposes the barb holder handle and the cradle jaw opposes the barb holder jaw;

a cradle mounted on the cradle jaw suitable for receiving a peripheral portion of an irrigation tubing; and a barb holder mounted on the barb holder jaw, the barb holder being a cavity formed by two opposing barb holder jaw members and having an axis aligned with the cradle, the opposing barb holder jaw members forming a slot opening therebetween, the slot opening being sized to allow snap fitting of the hollow cylinder of a barb emitter laterally into the cavity, a shoulder formed by the lower edges of the opposing jaw members extending inwardly into the cavity acting against an annular disk shoulder on a barb emitter to force a piercing point on the barb emitter to penetrate a periphery of an irrigation tubing held within the cradle when the cradle jaw and the barb holder jaw are brought together, a barb emitter being released from the barb holder and retained within the irrigation tubing upon movement of the barb holder away from the cradle.

2. The tool as set forth in claim 1 wherein the cradle is a V-shape with an opening facing the barb holder jaw and which extends laterally from the cradle jaw for receiving an irrigation tubing.

3. The tool as set forth in claim 1 further comprising a notch in one of the cradle jaw or the barb holder jaw which mates with a corresponding knife in the other of the cradle jaw or the barb holder jaw to cut such small extension tubing to desired lengths.

4. The tool as set forth in claim 1 further comprising a punch releasably secured within the hollow cylinder, the shoulder within the hollow cylinder acting against an annular spacer on the punch when the cradle jaw and the barb holder jaw are brought together to force a piercing point on the punch to penetrate the periphery of an irrigation tubing held within the cradle when the cradle jaw and the barb holder jaw are brought together.

5. The tool as set forth in claim 4 wherein the punch further includes a threaded shaft extends opposite the piercing point completely through the cavity, the threaded shaft releasably but firmly engaging a wing nut, the wing nut and threaded shaft cooperating with the shoulder and the annular spacer to releasably secure the punch in the barb holder.

6. The tool as set forth in claim 1 wherein the two opposing jaw members are separated to engage the hollow cylinder of a barb emitter.

7. A tool for installing irrigation barb emitters in irrigation tubing, the tool comprising:

a cradle member having a cradle handle and a cradle jaw on opposing ends thereof, and a barb holder member having a barb holder handle and a barb holder jaw on opposing ends thereof, the cradle member and the barb holder member being arranged in crossed relation and connected intermediate the opposing ends at a pivot such that the cradle handle opposes the barb holder handle and the cradle jaw opposes the barb holder jaw;

a cradle mounted on the cradle jaw suitable for receiving a peripheral portion of an irrigation tubing;

a barb holder mounted on the barb holder jaw, the barb holder being a hollow cylinder having an axis aligned with the cradle when the cradle jaw and the barb holder jaw are brought together, the hollow cylinder releasably receiving a barb emitter, a shoulder within the hollow cylinder suitable for acting against an annular disk shoulder on a barb emitter to force a piercing point on the barb emitter to penetrate a periphery of an irrigation tubing held within the cradle when the cradle jaw and the barb holder jaw are brought together, a barb emitter being released from the barb holder and retained within the irrigation tubing upon movement of the barb holder away from the cradle, and a cavity having a slot opening, the cavity being formed by two opposing jaw members extending laterally from the hollow cylindrical cavity.

8. The tool as set forth in claim 7 further comprising a notch in one of the cradle jaw or the barb holder jaw which mates with a corresponding knife in the other of the cradle jaw or the barb holder jaw to cut such small extension tubing to desired lengths.

9. A tool for installing irrigation barb emitters in irrigation tubing, the tool comprising:

a cradle member having a cradle handle and a cradle jaw on opposing ends thereof, and a barb holder member having a barb holder handle and a barb holder jaw on opposing ends thereof, the cradle member and the barb holder member being arranged in crossed relation and connected intermediate the opposing ends at a pivot such that the cradle handle opposes the barb holder handle and the cradle jaw opposes the barb holder jaw;

a cradle opening upwardly and extending widthwise mounted on the cradle jaw adapted to receive a peripheral portion of an irrigation tubing; and a barb holder mounted on the barb holder jaw, the barb holder being a hollow cylinder having an axis aligned with the cradle when the cradle jaw and the barb holder jaw are brought together, the hollow cylinder releasably receiving a barb emitter, a shoulder within the hollow cylinder suitable for acting against an annular disk shoulder on a barb emitter to force a piercing point on the barb emitter to penetrate a periphery of an irrigation tubing held within the cradle when the cradle jaw and the barb holder jaw are brought together, a barb emitter being released from the barb holder and retained within the irrigation tubing upon movement of the barb holder away from the cradle.

10. The tool as set forth in claim 9 wherein the cradle is a V-shape with an opening facing the barb holder jaw and which extends laterally from the cradle jaw for receiving an irrigation tubing.

* * * * *